US010827674B2

(12) United States Patent
Estock et al.

(10) Patent No.: US 10,827,674 B2
(45) Date of Patent: Nov. 10, 2020

(54) EXTENDABLE TABLE ADJUSTING WINDROW CHUTE

(71) Applicant: CNH Industrial America LLC, New Holland, PA (US)

(72) Inventors: Nicholas Estock, Mason, OH (US); Nathan Isaac, Lancaster, PA (US); Herbert Farley, Elizabethtown, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/217,619

(22) Filed: Dec. 12, 2018

(65) Prior Publication Data

US 2020/0187418 A1 Jun. 18, 2020

(51) Int. Cl.
*A01D 41/12* (2006.01)
*A01D 41/02* (2006.01)

(52) U.S. Cl.
CPC ......... *A01D 41/1243* (2013.01); *A01D 41/12* (2013.01); *A01D 41/02* (2013.01)

(58) Field of Classification Search
CPC ...... A01D 34/125; A01D 34/49; A01D 57/26; A01D 41/1423; A01D 41/1243; A01D 43/06; A01D 34/71; A01D 41/12; A01D 41/02; A01F 12/40; A01F 12/44; A01F 12/444
USPC .................................. 222/608; 404/101–108
See application file for complete search history.

(56) References Cited

U.S. PATENT DOCUMENTS

| | | | |
|---|---|---|---|
| 3,241,300 A * | 3/1966 | Fell | A01D 82/00 56/153 |
| 3,841,070 A * | 10/1974 | Scarnato | A01D 57/28 56/14.4 |
| 4,532,941 A * | 8/1985 | Gauthier | A01F 12/40 241/243 |
| 4,921,469 A | 5/1990 | Scharf | |
| 5,569,081 A * | 10/1996 | Baumgarten | A01D 41/1243 460/1 |
| 5,930,988 A | 8/1999 | Hanson | |
| 6,602,131 B2 * | 8/2003 | Wolters | A01F 12/40 460/111 |
| 6,775,968 B2 | 8/2004 | Carlot et al. | |

(Continued)

FOREIGN PATENT DOCUMENTS

| | | |
|---|---|---|
| DE | 102006042970 A1 | 4/2008 |
| EP | 3023002 A1 | 5/2016 |

(Continued)

OTHER PUBLICATIONS

Extended European Search Report for EP Application No. 19215626.3 dated May 12, 2020 (five pages).

*Primary Examiner* — Thomas B Will
*Assistant Examiner* — John D Misa
(74) *Attorney, Agent, or Firm* — Peter Zacharias; Patrick Sheldrake (57) ABSTRACT

A spreader configured for dispersing a non-grain crop material onto a field. The spreader includes a floor panel having a distal end, a pair of side deflectors pivotally connected to the floor panel, and a table slideably connected to the floor panel and slideable between a retracted position and an extended position in which at least a portion of the table is extended past the distal end of the floor panel.

18 Claims, 6 Drawing Sheets

(56) References Cited

U.S. PATENT DOCUMENTS

| | | | |
|---|---|---|---|
| 6,854,251 B2 * | 2/2005 | Snider | A01D 82/00 |
| | | | 56/192 |
| 6,860,805 B2 * | 3/2005 | Kuhn | A01D 41/1243 |
| | | | 460/111 |
| 7,008,315 B2 * | 3/2006 | Redekop | A01D 41/1243 |
| | | | 460/112 |
| 7,063,613 B2 * | 6/2006 | Weichholdt | A01F 12/40 |
| | | | 460/112 |
| 7,066,810 B2 * | 6/2006 | Farley | A01D 41/1243 |
| | | | 460/112 |
| 7,220,179 B2 * | 5/2007 | Redekop | A01D 41/1243 |
| | | | 460/112 |
| 7,559,833 B2 | 7/2009 | Issac et al. | |
| 7,927,200 B2 * | 4/2011 | Van Overschelde | A01F 12/40 |
| | | | 460/112 |
| 8,020,364 B2 * | 9/2011 | Walch | A01D 34/66 |
| | | | 56/320.1 |
| 9,137,944 B2 * | 9/2015 | Dilts | A01D 41/1243 |
| 9,565,800 B2 | 2/2017 | Fay, II et al. | |
| 9,591,804 B2 * | 3/2017 | Isaac | A01D 41/1243 |
| 9,894,837 B2 * | 2/2018 | Estock | A01D 43/06 |
| 10,336,546 B2 * | 7/2019 | Dilts | A01D 41/1243 |
| 2006/0123764 A1 | 6/2006 | McLean et al. | |
| 2008/0305841 A1 * | 12/2008 | Overschelde | A01D 41/1243 |
| | | | 460/59 |
| 2014/0066147 A1 | 3/2014 | Dilts et al. | |
| 2014/0096498 A1 | 4/2014 | Estock et al. | |
| 2016/0135377 A1 * | 5/2016 | Ballegeer | A01D 41/1243 |
| | | | 460/112 |
| 2018/0325024 A1 * | 11/2018 | Rotole | A01D 43/10 |

FOREIGN PATENT DOCUMENTS

| | | | | |
|---|---|---|---|---|
| EP | 3395152 A1 | | 10/2018 | |
| EP | 3459335 A1 * | | 3/2019 | B65G 11/126 |
| EP | 3530097 A1 * | | 8/2019 | A01D 41/1243 |

\* cited by examiner

EXTENDABLE TABLE ADJUSTING WINDROW CHUTE

BACKGROUND OF THE INVENTION

The present invention pertains to agricultural harvesters and, more specifically, to an agricultural harvester with a crop chute.

An agricultural vehicle known as a harvester "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan. From the grain pan the grain is cleaned using a cleaning system, and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a discharge system out the rear of the combine. When the grain tank becomes full, the combine is positioned adjacent to a vehicle into which the grain is to be unloaded, such as a semi-trailer, gravity box, straight truck, or the like; and an unloading system on the combine is actuated to transfer the grain into the vehicle.

The discharge system generally includes a straw chopper located rearwardly of the threshing rotor and a spreader assembly that is positioned downstream of the straw chopper. The straw chopper slices the non-grain crop material into smaller pieces to promote decomposition of the residue material. The spreader assembly may distribute the non-grain crop material back onto the field in a dispersed pattern or in windrows. The spreader assembly can include rotating spreaders for ejecting the non-grain crop material in a dispersed pattern and/or a spreader chute comprised of a floor panel and a pair of side panels for depositing the non-grain crop material in windrows. If the agricultural vehicle deposits the non-grain crop material in windrows, another secondary agricultural vehicle may subsequently pick up the windrows for further processing. For instance, a baler may subsequently pick up the windrows to create bales, which can be used to feed livestock.

It is known to adjust the orientation of the chute and/or the angle of the side panels of the spreader assembly to alter the distribution pattern or windrow width of the deposited non-grain crop material. For example, the whole chute may be pivotally attached to the chassis of the combine harvester, and the side panels may be pivotally attached to the floor panel. Accordingly, an operator may manually move the chute or side panels in a variety of indexed positions. However, adjusting the chute and/or side panels can be burdensome and time consuming. Additionally, the position of the floor and side panels of the chute may interfere with the maintenance of the combine harvester because an operator may not be able to mount a service ladder onto the rear of the combine due to the protruding profile of the chute.

What is needed in the art is an easy-to-adjust crop chute with a wide range of operating positions.

SUMMARY OF THE INVENTION

In one exemplary embodiment formed in accordance with the present invention, there is provided an adjustable length windrow or swath chute. The windrow chute includes a floor panel, a pair of side deflectors pivotally attached to the floor panel, and a sliding table that is slideably connected to the floor panel. The sliding table can be moved into an extended position in which the table extends past the end of the floor panel and a retracted position in which the table does not extend past the end of the floor panel. The sliding table and side deflectors can be movably linked to one another such that the side deflectors pivot with the motion of the table. The retracted position may also serve as a maintenance or service position in which an operator may easily access the rear of the combine.

In another exemplary embodiment formed in accordance with the present invention, there is provided a spreader for an agricultural vehicle. The spreader includes a floor panel having a distal end, a pair of side deflectors pivotally connected to the floor panel, and a table slideably connected to the floor panel and slideable between a retracted position and an extended position in which at least a portion of the table is extended past the distal end of the floor panel.

In another exemplary embodiment formed in accordance with the present invention, there is provided an agricultural vehicle including a chassis and a spreader connected to the chassis. The spreader is configured for dispersing a non-grain crop material onto a field. The spreader includes a floor panel having a distal end, a pair of side deflectors pivotally connected to the floor panel, and a table slideably connected to the floor panel and slideable between a retracted position and an extended position in which at least a portion of the table is extended past the distal end of the floor panel.

In yet another exemplary embodiment formed in accordance with the present invention, there is provided a method for dispersing non-grain crop material. The method includes an initial step of providing a spreader configured for dispersing the non-grain crop material onto a field. The spreader includes a floor panel having an end, a pair of side deflectors pivotally connected to the floor panel, and a table slideably connected to the floor panel and moveably linked to the side deflectors so that a motion of the table automatically adjusts the side deflectors. The table is slideable between a retracted position and an extended position. The method further includes the step of sliding the table outwardly into the extended position, which correspondingly narrows the side deflectors, or sliding the table inwardly into the retracted position, which correspondingly widens the side deflectors.

One possible advantage of the exemplary embodiment of the agricultural vehicle is that the operator may easily conduct various maintenance procedures on the combine harvester when the table of the windrow chute is in the retracted, service position.

Another possible advantage of the exemplary embodiment of the agricultural vehicle is that the table effectively increases the working surface area of the windrow chute when the table is in the extended position, which thereby alters the trajectory of the crop material exiting the combine harvester.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown Like numerals indicate like elements throughout the drawings. In the drawings.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also, the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting. The terms "downstream" and "upstream" are determined with reference to the intended direction of crop material flow during operation, with "downstream" being analogous to "rearward" and "upstream" being analogous to "forward."

Figure 1:
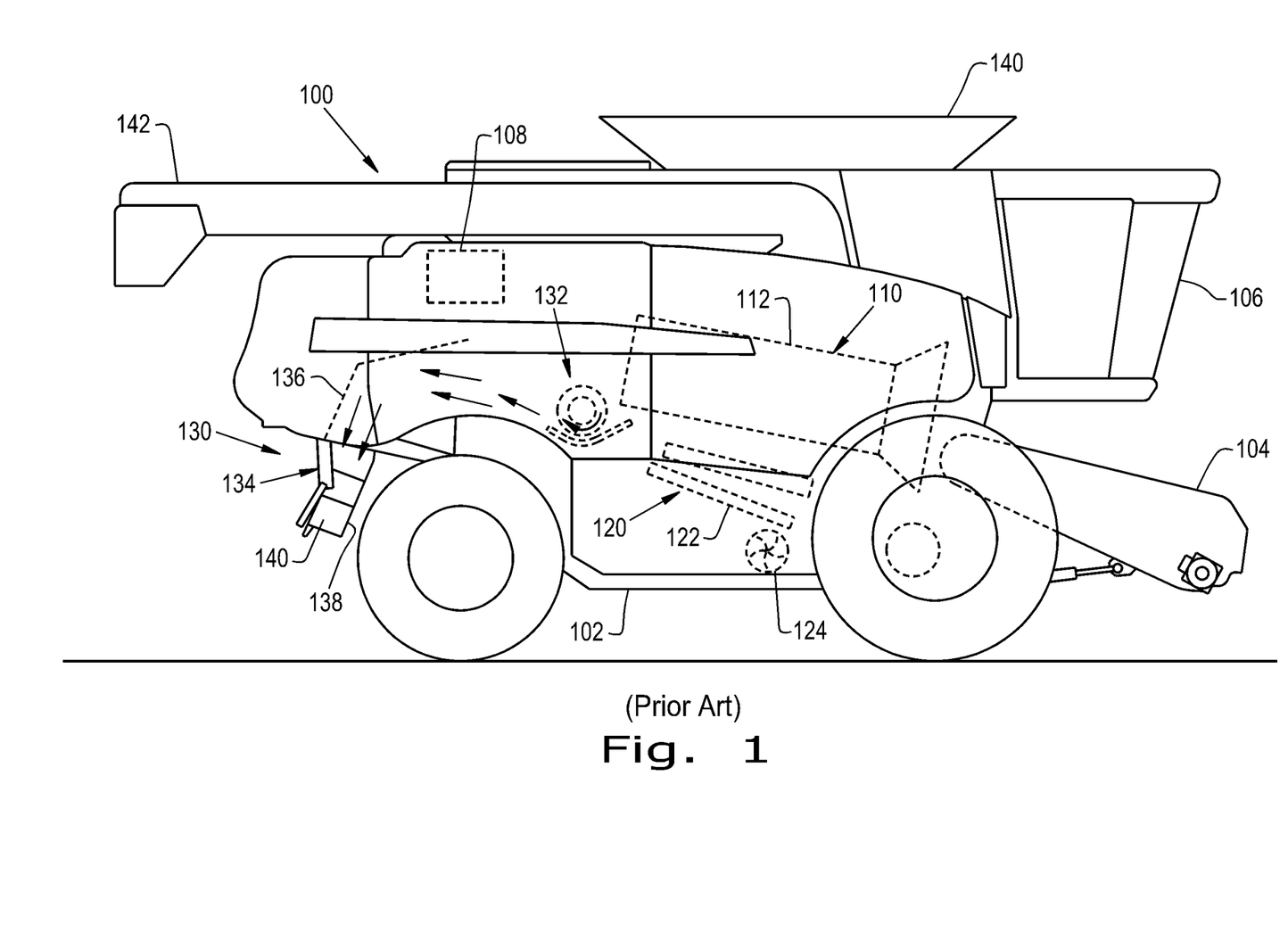
FIG. 1 illustrates a side view of a known agricultural vehicle which includes a chassis and a windrow chute.

Referring now to the drawings, and more specifically to FIG. 1, there is shown a conventional agricultural vehicle 100. The agricultural vehicle 100 may be in the form of any desired agricultural vehicle, such as a combine harvester or windrower. As shown in FIG. 1, the agricultural vehicle 100 is in the form of a combine harvester 100 and generally includes a chassis 102, a feeder housing 104, an operator cab 106, a prime mover 108, a threshing system 110, a cleaning system 120, and a discharge system 130. The combine harvester 100 may also include an onboard grain tank 140 and an unloading auger 142.

The threshing system 110 may be of the axial-flow type, and may thereby include an axially displaced rotor 112, which is rotatable about a longitudinal rotor axis thereof and is at least partially enclosed by and rotatable within a corresponding, cylindrical rotor housing (not shown). The housing is perforated and is typically comprised of adjustable concaves. As the crop material enters the threshing system 110 from the feeder housing 104, the crop material may be helically conveyed from the front to the rear of the housing via the motion of the rotor 112. Furthermore, the threshing operation of the rotor 112 removes the grain from the crop material, and the grain falls through the perforations of the housing and passes onto the cleaning system 120.

The cleaning system 120 generally includes a grain pan (not shown), one or more sieve(s) 122, and a cleaning fan 124. In operation, the cut crop material which has been threshed and separated by threshing system 110 falls onto the grain pan and the sieve(s) 122. The grain pan and the sieve(s) 122 may oscillate in a fore-to-aft manner in order to further sift the crop material. The cleaning fan 124 provides an airflow through the sieve(s) 122 to remove chaff and other impurities such as dust from the grain via making this material airborne for discharge out of the rear of the combine harvester 100. After passing through the cleaning system 120, the clean grain falls to a clean grain auger positioned crosswise below and in front of the sieve(s) 122. The clean grain auger conveys the clean grain laterally to a generally vertically arranged grain elevator for transport to the grain tank 140. Once the grain tank 140 becomes full, the grain may be transported via the unloading auger 142 to a service vehicle.

The non-grain crop material, e.g. MOG, proceeds out of the rear of the combine harvester 100 through the discharge system 130. The discharge system 130 may include a discharge chopper 132 and a residue spreader 134. After the MOG exits the threshing rotor 112, it falls onto the discharge chopper 132 which further chops the MOG into smaller pieces. From the discharge chopper 132, the MOG passes through a duct 136 which channels the MOG to the residue spreader 134. The residue spreader 134 may be in the form of a windrow chute 134, which can be composed of a floor panel 138 and side deflectors 140. The residue spreader 134 can be pivotally mounted to the chassis 102 of the combine harvester 100. The side deflectors 140 can be pivotally mounted to the floor panel 138 such that the side deflectors 140 can be narrowed or widened to adjust the width of the windrows.

Figure 2:
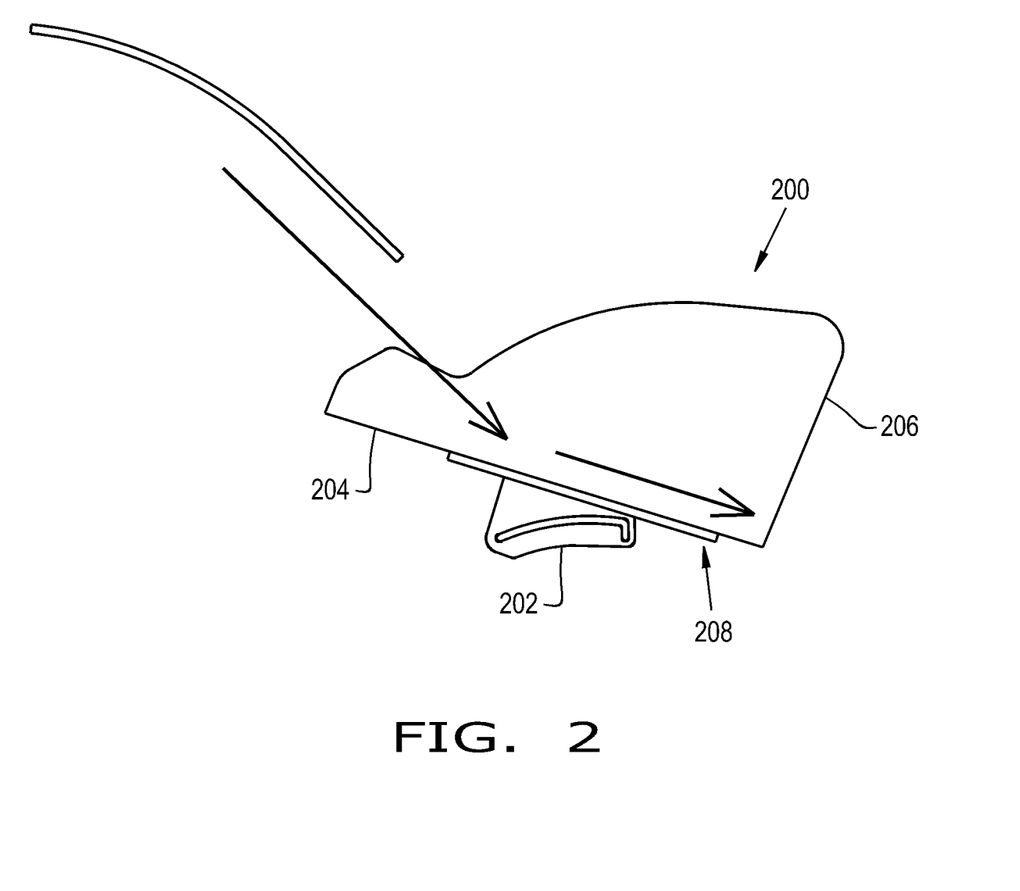
FIG. 2 is a side view an exemplary embodiment of a spreader which includes a sliding table that is slideably attached to the floor panel and movably linked to the side deflectors, in accordance with an exemplary embodiment of the present invention.
Figure 3:
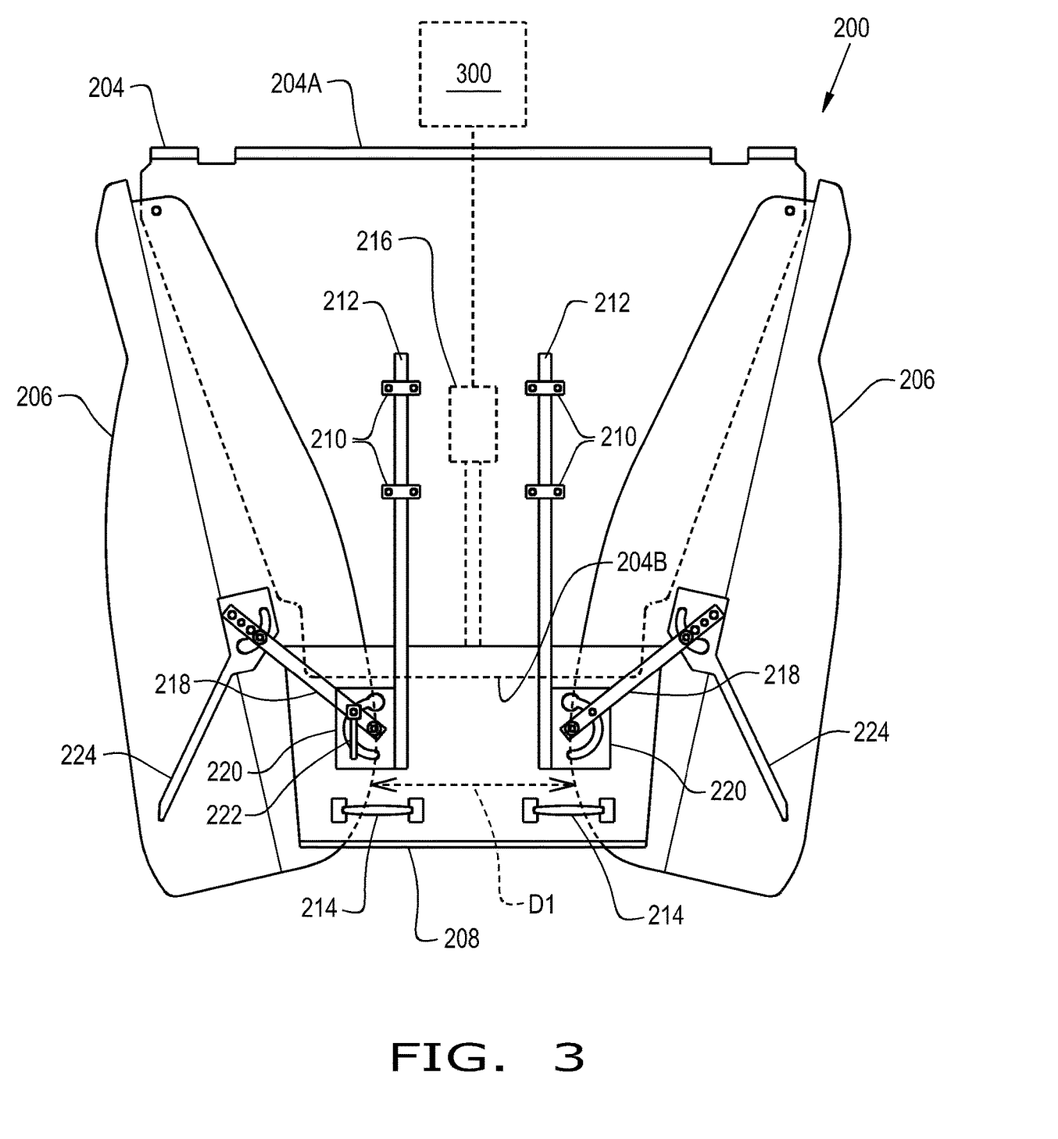
FIG. 3 is a bottom view of the windrow chute of FIG. 2 in an extended position, in accordance with an exemplary embodiment of the present invention.
Figure 4:
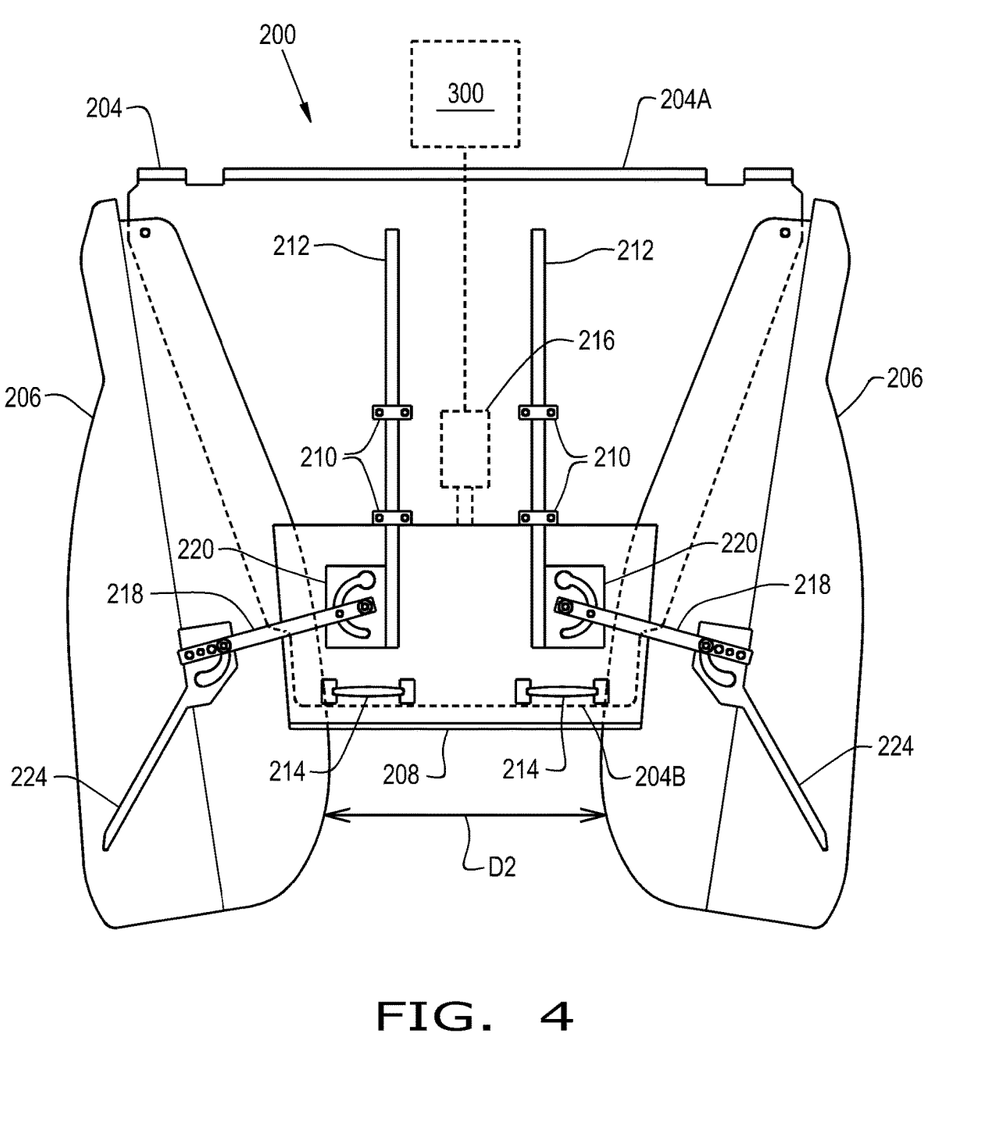
FIG. 4 is a bottom view of the windrow chute of FIGS. 2-3 in a retracted position, in accordance with an exemplary embodiment of the present invention.

Referring now to FIGS. 2-4, there is shown an exemplary embodiment of a spreader 200 for an agricultural vehicle, such as the agricultural vehicle 100 as described above. The spreader 200 can be pivotally connected to the chassis 102 of the combine harvester 100 by an adjustment mount 202 (FIG. 2). As shown, the spreader 200 is a windrow chute 200 which dispenses MOG exiting the combine harvester 100 into windrows on the field; however, the spreader 200 can have any desired configuration and may be mounted on any desired agricultural vehicle 100.

The windrow chute 200 generally includes a floor panel 204, a pair of side deflectors 206 pivotally connected to the floor panel 204, and a table 208 slideably connected to the floor panel 204. The table 208 is adjustable between an extended position (FIG. 3) and a retracted position (FIG. 4). The table 208 can be extended so that at least a portion of the table 208 extends beyond the floor panel 204, increasing the effective working surface area of the windrow chute 200. The table 208 can also be partially or completely retracted such that the top surface area of the floor panel 204 predominantly or entirely comprises the effective working surface area of the windrow chute 200. As used herein, the retracted position refers to a position of the table 208 in which the table 208 is substantially, or completely, underneath the floor panel 204 (FIG. 4), and the extended position refers to a position of the table 208 in which the table 208 is substantially exposed such that the exposed surface area of the table 208 increases the effective working surface area of the windrow chute 200. It should be appreciated that the table 208 can be adjusted into numerous positions in between the bounds of the retracted and extended positions. Thereby, the extension of the table 208 can variably increase the effective working surface area of the windrow chute 200 to redirect non-grain material from a vertically downward trajectory to a more horizontal trajectory.

The fully retracted position can also function as a service position, in addition to being a working position of the windrow chute 200. For instance, in the retracted position, i.e., service position, an operator may mount a service ladder onto the rear of the combine harvester 100, and thereby perform any requisite service operation, due to the reduced profile of the windrow chute 200, since the table 208 can be fully retracted and/or the side deflectors 206 can be pivoted outwardly, e.g. widened.

The floor panel 204 can be connected to the adjustment mount 202 or onto the chassis 102 of the combine harvester 100. The floor panel 204 can have any desired shape and can be composed of any desired material, such as sheet metal. The floor panel 204 can have a topside and underside surface and a proximal and distal end 204A, 204B. The floor panel 204 has a longitudinal axis that extends through the proximal end 204A and the distal end 204B. The top side of the floor panel 204 defines the floor panel surface area. The underside of the floor panel 204 has at least one coupling member 210, which is directly attached to the underside of the floor panel 204 by one or more fasteners (FIGS. 3-4). The at least one coupling member 210 slideably mounts the table 208 to the floor panel 204. Each coupling member 210 can be in the form of a bracket 210 or any other desired fastener.

The side deflectors 206 can be pivotally attached to the floor panel 204 at a location near the proximal end 204A of the floor panel 204. The side deflectors 206 can be in the form of any desired side deflectors 206, such as side panels. The side deflectors 206 can be composed of any desired material, such as sheet metal, and they may have any desired shape.

The table 208 can be slideably attached to the underside of the floor panel 204 and be adjustable between the retracted and extended positions. The table 208 may or may not be parallel to the floor panel 204. The table 208 may slide along the longitudinal axis of the floor panel 204. For example, the table 208 may further include at least one rail 212 which is slideably received within the at least one coupling member 210. The at least one rail 212 is fixedly attached to the table 208 and slideably attached to the floor panel 204. In some embodiments, the windrow chute 200 may include two rails 212 and four coupling members 210 such that each rail 212 is guided and at least partially supported by two coupling members 210 acting in tandem. It should be appreciated that each rail 212 can be supported by one, two, three, or more coupling members 210. Alternatively, the rails 212 can be supported by channels or slots. As the rails 212 slide inwardly toward the proximal end 204A of the floor panel 204, the table 208 slides underneath the floor panel 204, and as the rails 212 slide outwardly, i.e., away from the proximal end 204A of the floor panel 204, the table 208 slides outwardly such that the table 208 at least partially slides past or beyond the distal end 204B of the floor panel 204. It should be appreciated that the windrow chute 200 can include a locking device connected to the rails 212 and/or the coupling members 210 to lock the rails 212 in a desired position. The table 208 can have any desired cross-section, such as a trapezoidal cross-section, and the table 208 can comprise any desired material, such as sheet metal.

In some exemplary embodiments of the windrow chute 200 of the present invention, the table 208 can be manually and/or automatically actuated. For example, the table 208 can include one or more handle(s) 214 so that an operator may manually grab the handle(s) 214 and alter the position of the table 208. Additionally or alternatively, the windrow chute 200 may include one or more actuator(s) 216 and a controller 300 may be provided on the agricultural vehicle 100 or windrow chute 200 to automatically retract or extend the table 208.

The actuator(s) 216 may be operably connected to the controller 300 and attached to the underside of the floor panel 204 and to the top of the table 208. As shown, the windrow chute 200 includes one actuator 216, which may be in the form of a hydraulic or an electric cylinder 216. However, the actuator 216 can be in the form of any desired actuator, such as a motor. In an alternative embodiment, the actuator(s) 216 may be coupled to at least one rail 212. The actuator(s) 216 may have an integrated position sensor that sends a position signal to the controller 300 so that the controller 300 is notified when the table 208 is in the extended or retracted position.

The controller 300 can be operably connected to the actuator(s) 216. The controller 300 may be operably coupled to a user interface so that the operator of the agricultural vehicle 100 can input a command to either retract or extend the table 208, and the controller 300 can subsequently and automatically activate the actuator 216 to retract or extend the table 208 based upon the user command. The controller 300 may be in the form of any desired electronic control unit (ECU), and the controller 300 may be incorporated into existing hardware and/or software of the agricultural vehicle 100.

In some exemplary embodiments of the present invention, the table 208 can be moveably linked to the side deflectors 206 such that, as the table 208 slides into the extended position, the side deflectors 206 correspondingly narrow, being separated from one another by a narrowed distance D1 (FIG. 3). As the table 208 slides into the retracted position, the side deflectors 206 correspondingly widen, being separated from one another by a widened distance D2 that is greater than D1 (FIG. 4). For example, as the table 208 slides outwardly, such as approximately 15-20 inches, into the extended position, the side deflectors 506 may narrow approximately 5-12 inches. Thereby, the side deflectors may pivot between approximately 1-20 degrees as the table 208 slides in between the extended and retracted positions.

The spreader 200 may additionally include a pair of linkages 218 to movably link the table 208 and side deflectors 206 such that a motion of the table 208 automatically adjusts the side deflectors 206. Furthermore, the spreader 200 may also include tracks 220 connected to the underside of the table 208 for restricting the pivoting motion of the linkages 218. For example, the tracks 220 may include slots (unnumbered), and the linkages 218 can be pivotally attached to the tracks 220 by fasteners at two locations so that the tracks 220 define a fixed pivot axis and the slots of the tracks 220 limit the pivoting movement of the linkages 218. The linkages 218 may have corresponding holes through which the fasteners extend in order to pivotally connect the linkages 218 to the tracks 220. It should be appreciated that the windrow chute may include a locking feature 222 connected to one or both of the tracks 220 and/or linkages 218 (FIG. 3). As shown, the windrow chute 200 includes a locking feature 222, connected to one linkage 218, that is in the form of a locking lever 222 to secure the linkage 218 relative to the respective side deflector 206. In turn, the locking feature 222 may also prevent the table 208 from sliding. It is possible for the linkages 218 to be directly, pivotally attached to the underside of the table 208 and to the side deflectors 206.

The spreader 200 may further include a pair of support members 224. Each support member 224 can be connected to a respective side deflector 206 and linkage 218 (FIGS. 3-4). The support members 224 can be configured for respectively mounting the linkages 218 in an initial position, and thereby setting the side deflectors 206 in an initial position relative to the table 208. Each support member 224 can have a first end with an integrated slot (unnumbered), which is connected the respective linkage 218, and a second end in the form of a support rod which is fixedly attached to the side deflector 206. The linkages 218 can be pivotally connected to the first end of the support members 224 at a fixed pivot axis and at the integrated slots so that a pivoting motion of the support members 224 is limited by the slots. Furthermore, the linkages 218 may include multiple holes, such as four, six, eight, etc., so that an operator may adjustably fasten the linkages 218 and the support members 224 together within a range of preset positions.

Figure 5:
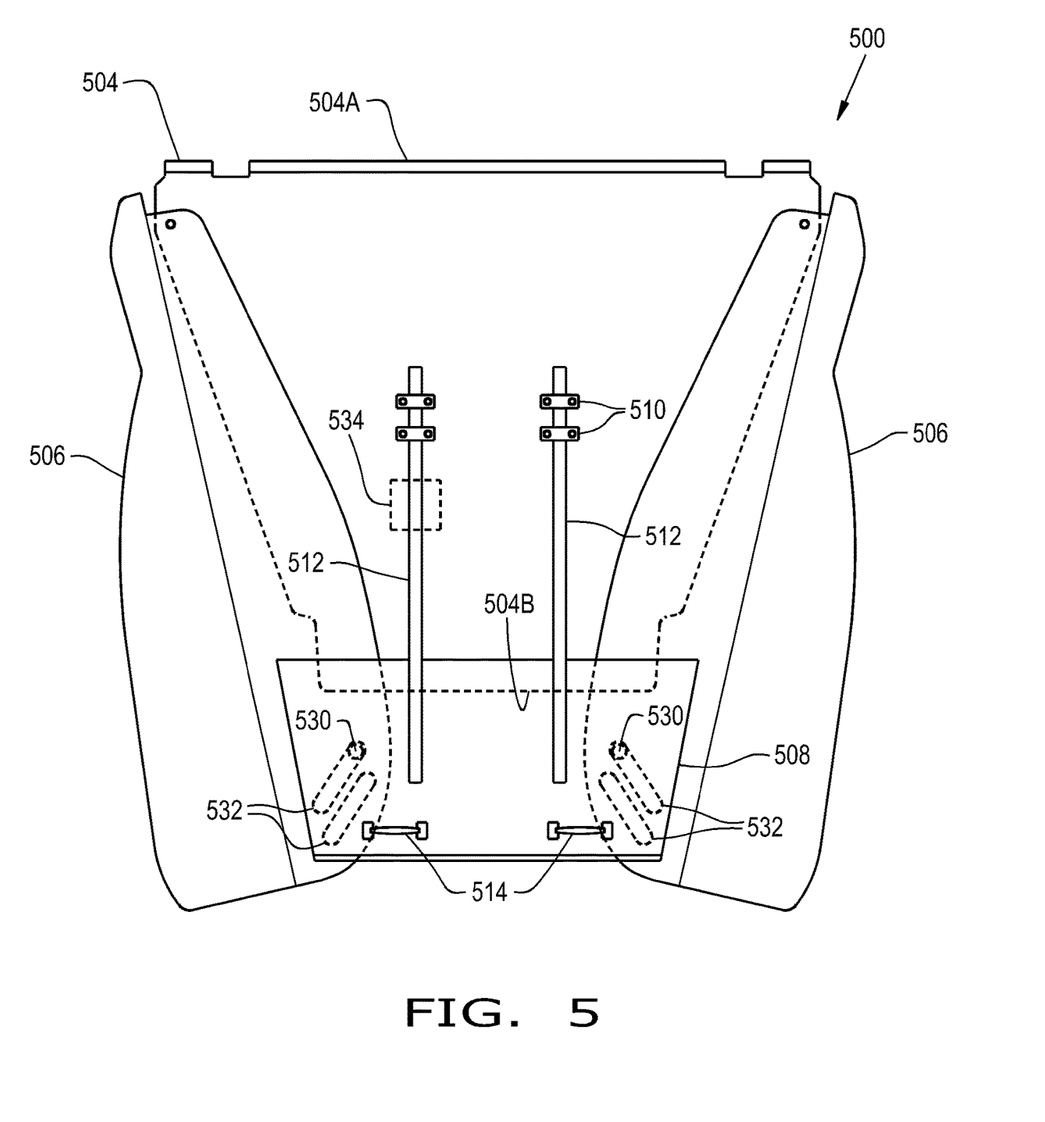
FIG. 5 is a bottom view of another exemplary embodiment of a windrow chute, in accordance with an exemplary embodiment of the present invention.

Referring now to FIG. 5, there is shown another exemplary embodiment of a spreader 500 in the extended position. The spreader 500 can be substantially similar to the spreader 200, as described above, except that the spreader 500 movably links the table 508 and the side deflectors 506 via protrusions 530 on the side deflectors 506 and grooves 532 on the table 508. Like components have been identified with like reference characters, except for having the 500 series designation. It should be appreciated that the windrow chute 500 may include a controller and an actuator as well as a locking feature 534 connected to at least one of the rails 512 and/or coupling members 210.

Each side deflector 506 may include at least one protrusion 530, and the table 508 may include at least two grooves 532, such as two, four, six, etc., for respectively receiving a respective protrusion 530 of each side deflector 506. The protrusions 530 of the side deflectors 506 can be in the form of bulbous fingers. The grooves 532 of the table 508 may or may not extend through the depth of the table 508. As the table 508 slides between the retracted and extended positions, a motion of the table 508 correspondingly moves each side deflector 506.

Figure 6:
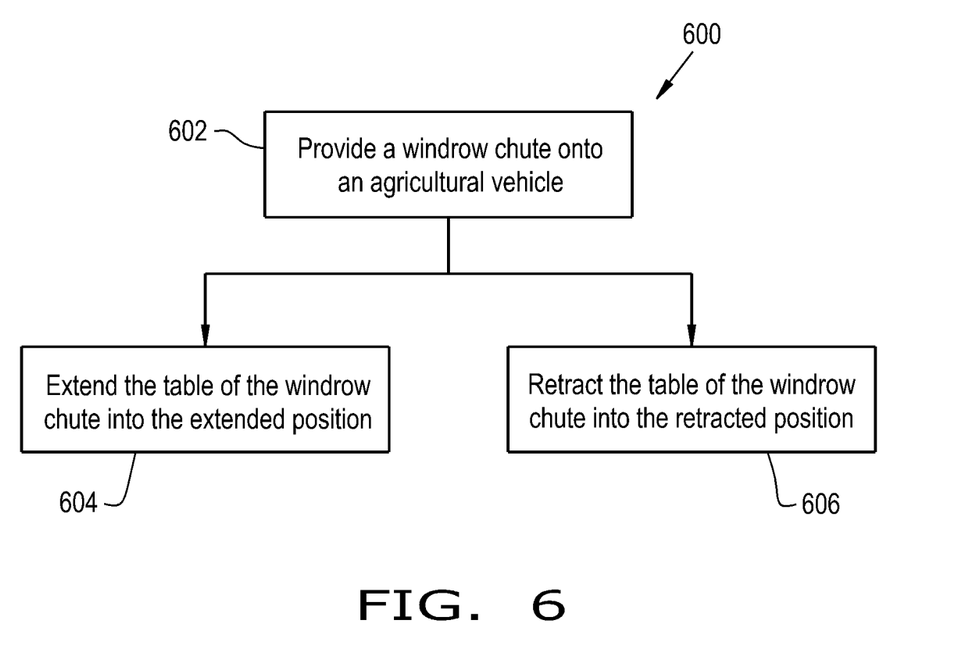
FIG. 6 is a flowchart of an exemplary method of operating a windrow chute, in accordance with an exemplary embodiment of the present invention.

Referring now to FIG. 6, there is shown a flowchart illustrating an exemplary method 600 for dispersing the non-grain crop material from the agricultural vehicle 100 onto the field. More particularly, the method 600 alters the effective working surface area of the spreader 200 to adjust the dispersion of the non-grain crop material. The method includes providing a windrow chute 200 onto the agricultural vehicle 100 (block 602). Then, the controller 300 and/or the operator can extend the table 208 of the windrow chute 200 into the extended position (block 604) or retract the table 208 of the windrow chute 200 into the retracted position (block 606). For example, the operator can initially input a user command into a user interface to extend or retract the table 208, which is then received by the controller 300. If the operator inputs an extend command, the controller 300 will activate the actuator 216 to outwardly slide the table 208 into the extended position, which correspondingly narrows the side deflectors 206 (block 604). If the operator inputs a retract command, the controller 300 will activate the actuator 216 to inwardly slide the table 208 into the retracted position, which correspondingly widens the side deflectors 206 (block 606). Alternatively, the operator may manually slide the table 208 in order to extend or retract the table 208, instead of having the controller 300 manipulate the actuator 216 according to the method 600. Furthermore, if the windrow chute 200 is equipped with support members 224, the operator may perform an initial step of mounting each linkage 218 to each support member 224 in an initial position.

It should be appreciated that the method 600 can be conducted when the spreader 200 is dispersing non-grain crop material onto the field, during operation of the agricultural vehicle 100, or when the spreader 200 is not in use, such as during maintenance of the agricultural vehicle 100. It is to be understood that the steps of the method 600 may be performed by the controller 300 upon loading and executing software code or instructions. The controller 300 may include software code or instructions which are tangibly stored on a tangible computer readable medium. The computer readable medium may be in the form of a magnetic medium, e.g., a computer hard drive, an optical medium, e.g., an optical disc, solid-state memory, e.g., flash memory, or other storage media known in the art. Thus, any of the functionality performed by the controller 300 described herein may be implemented in software code or instructions which are tangibly stored on the tangible computer readable medium. The controller 300 loads the software code or instructions via a direct interface with the computer readable medium or via a wired and/or wireless network. Upon loading and executing such software code or instructions by the controller 300, the controller 300 may perform any of the functionality described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A spreader for an agricultural vehicle, comprising:
a floor panel having a distal end;
a pair of side deflectors pivotally connected to the floor panel; and
a table slideably connected to the floor panel and slideable between a retracted position and an extended position in which at least a portion of the table is extended past the distal end of the floor panel,
wherein the table and side deflectors are moveably linked such that as the table slides into the extended position the side deflectors correspondingly narrow, and as the table slides into the retracted position the side deflectors correspondingly widen.

2. The spreader of claim 1, further comprising a pair of linkages respectively linking the table to each side deflector so that a motion of the table automatically adjusts the side deflectors.

3. The spreader of claim 2, further comprising a pair of support members, each support member is connected to a respective side deflector and a respective linkage.

4. The spreader of claim 1, wherein each side deflector comprises a protrusion and the table comprises at least two grooves for respectively receiving a respective protrusion of each side deflector, and as the table slides between the retracted and extended positions a motion of the table correspondingly moves each side deflector.

5. The spreader of claim 1, further comprising an actuator attached to the floor panel and the table, and the actuator is configured for retracting and extending the table.

6. The spreader of claim 1, further comprising at least one rail slideably connecting the table to the floor panel, and the at least one rail is fixedly attached to the table and slideably attached to the floor panel.

7. The spreader of claim 6, wherein the floor panel comprises an underside and at least one coupling member attached to the underside, and the at least one coupling member slideably receives and guides the at least one rail.

8. The spreader of claim 7, wherein the at least one rail comprises a pair of rails and the at least one coupling member comprises at least two coupling members for slideably receiving each respective rail.

9. An agricultural vehicle, comprising:
a chassis; and
a spreader connected to the chassis and configured for dispersing a non-grain crop material onto a field, the spreader comprising:
a floor panel having a distal end;
a pair of side deflectors pivotally connected to the floor panel; and
a table slideably connected to the floor panel and slideable between a retracted position and an extended position in which at least a portion of the table is extended past the distal end of the floor panel,
wherein the table and side deflectors are moveably linked such that as the table slides into the extended position the side deflectors correspondingly narrow, and as the table slides into the retracted position the side deflectors correspondingly widen.

10. The agricultural vehicle of claim 9, wherein the spreader further comprises a pair of linkages respectively linking the table to each side deflector so that a motion of the table automatically adjusts the side deflectors.

11. The agricultural vehicle of claim 10, wherein the spreader further comprises a pair of support members, each support member is connected to a respective side deflector and a respective linkage.

12. The agricultural vehicle of claim 9, wherein each side deflector comprises a protrusion and the table comprises at least two grooves for respectively receiving a respective protrusion of each side deflector, and as the table slides between the retracted and extended positions a motion of the table correspondingly moves each side deflector.

13. The agricultural vehicle of claim 9, wherein the spreader further comprises an actuator attached to the floor panel and the table, and the actuator is configured for retracting and extending the table.

14. The agricultural vehicle of claim 9, further comprising at least one rail slideably connecting the table to the floor panel, and the at least one rail is fixedly attached to the table and slideably attached to the floor panel.

15. The agricultural vehicle of claim 14, wherein the floor panel comprises an underside and at least one coupling member attached to the underside, and the at least one coupling member slideably receives and guides the at least one rail.

16. The agricultural vehicle of claim 15, wherein the at least one rail comprises a pair of rails and the at least one coupling member comprises at least two coupling members for slideably receiving each respective rail.

17. A method for dispersing a non-grain crop material, comprising the steps of:
providing a spreader configured for dispersing the non-grain crop material onto a field, the spreader comprises a floor panel having a distal end, a pair of side deflectors pivotally connected to the floor panel, and a table slideably connected to the floor panel and moveably linked to the side deflectors so that a motion of the table automatically adjusts the side deflectors, and the table is slideable between a retracted position and an extended position; and
one of:
sliding the table outwardly into the extended position, which correspondingly narrows the side deflectors; and
sliding the table inwardly into the retracted position, which correspondingly widens the side deflectors.

18. The method of claim 17, wherein the spreader further comprises a pair of linkages and a pair of support members, and each linkage connects the table to a respective side deflector, and each support member respectively connects each linkage to each side deflector.

* * * * *